Patented Aug. 10, 1943

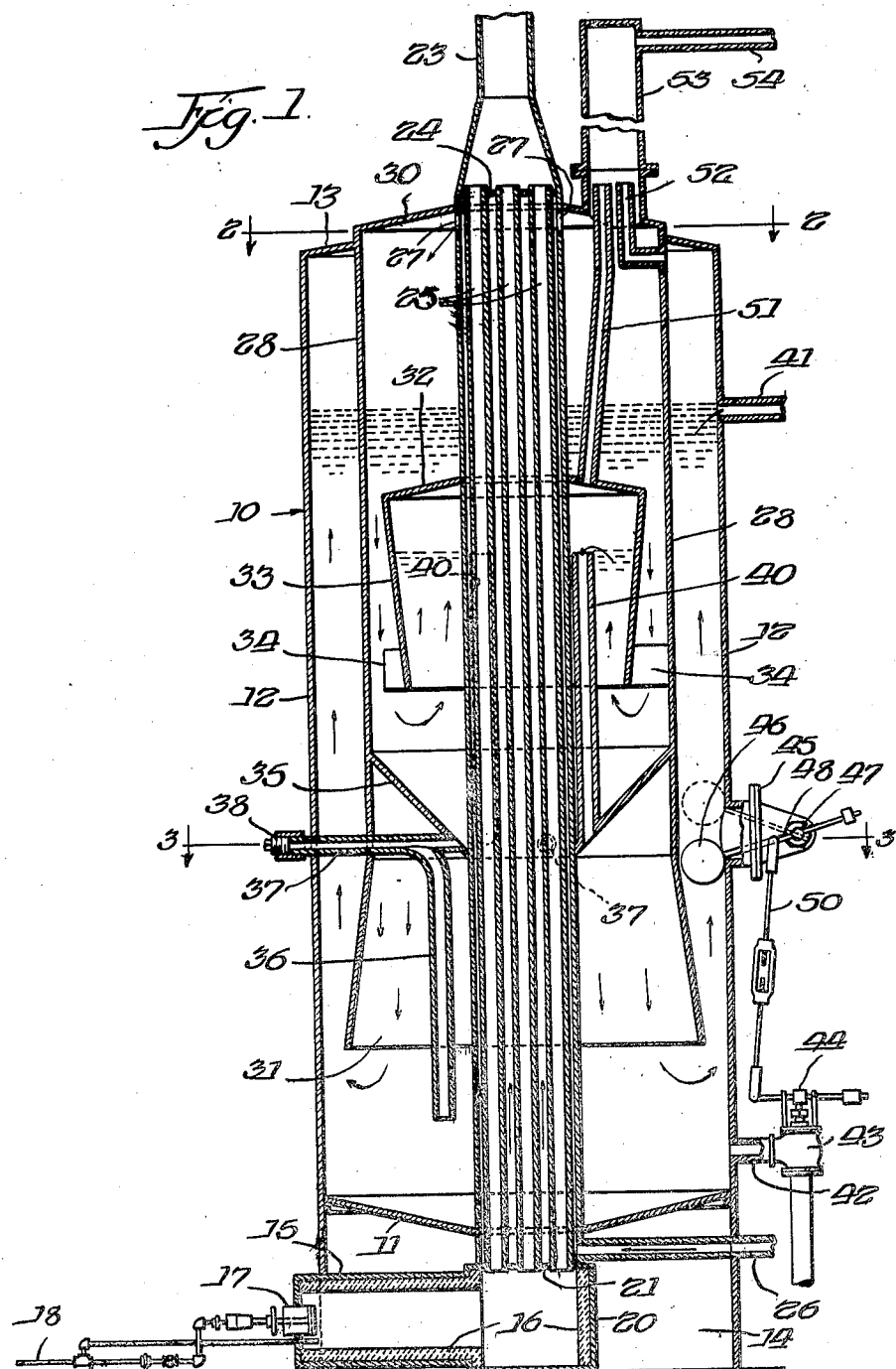

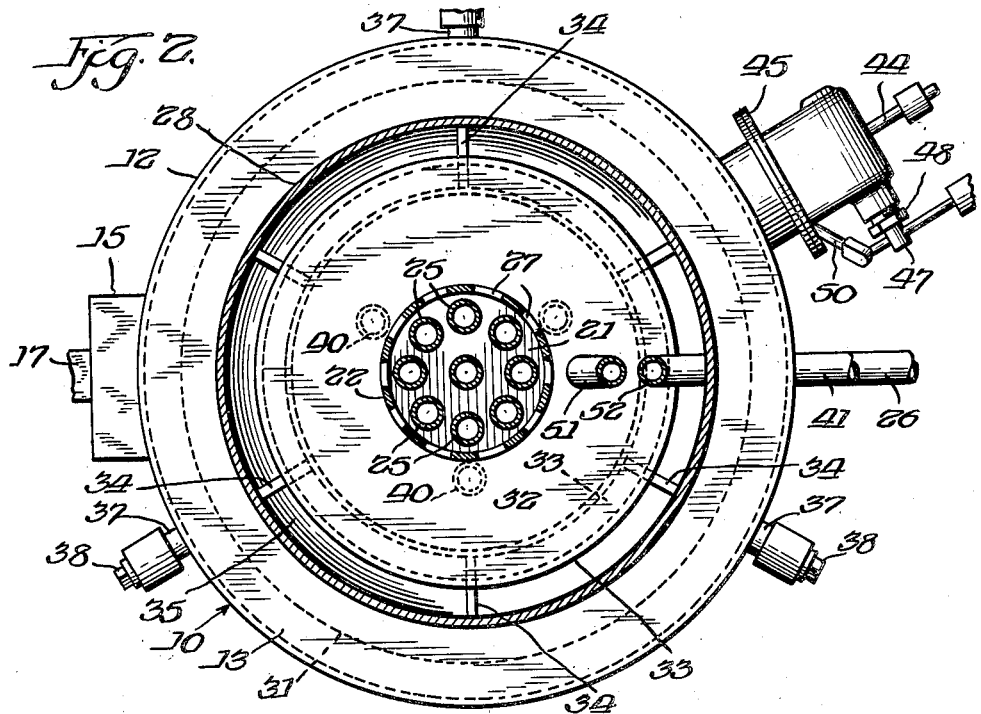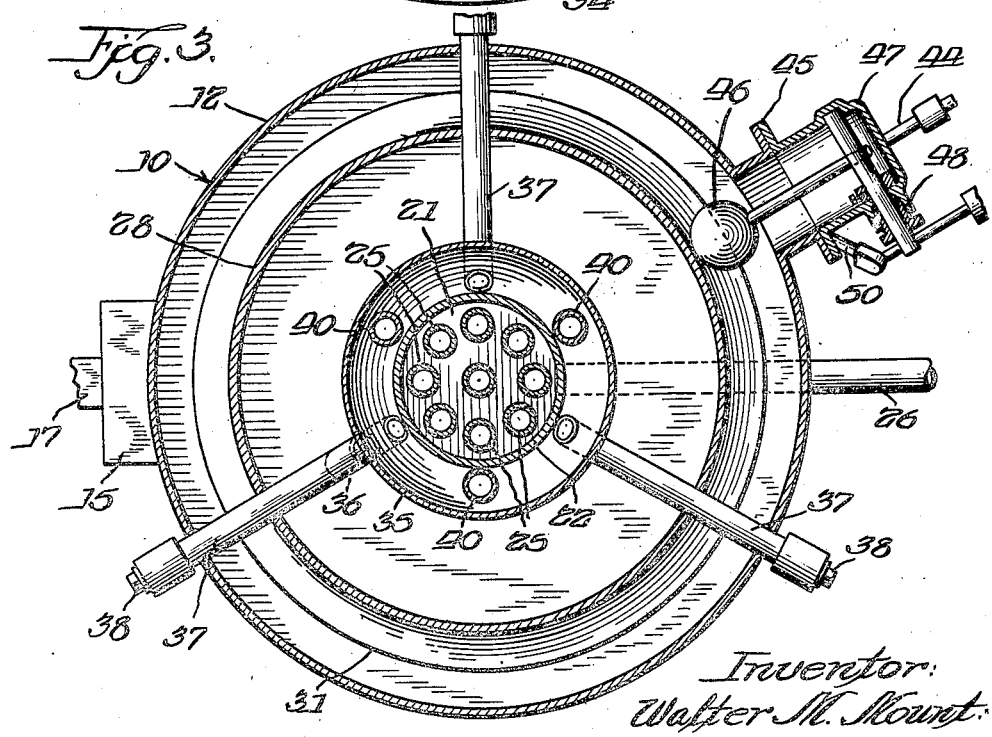

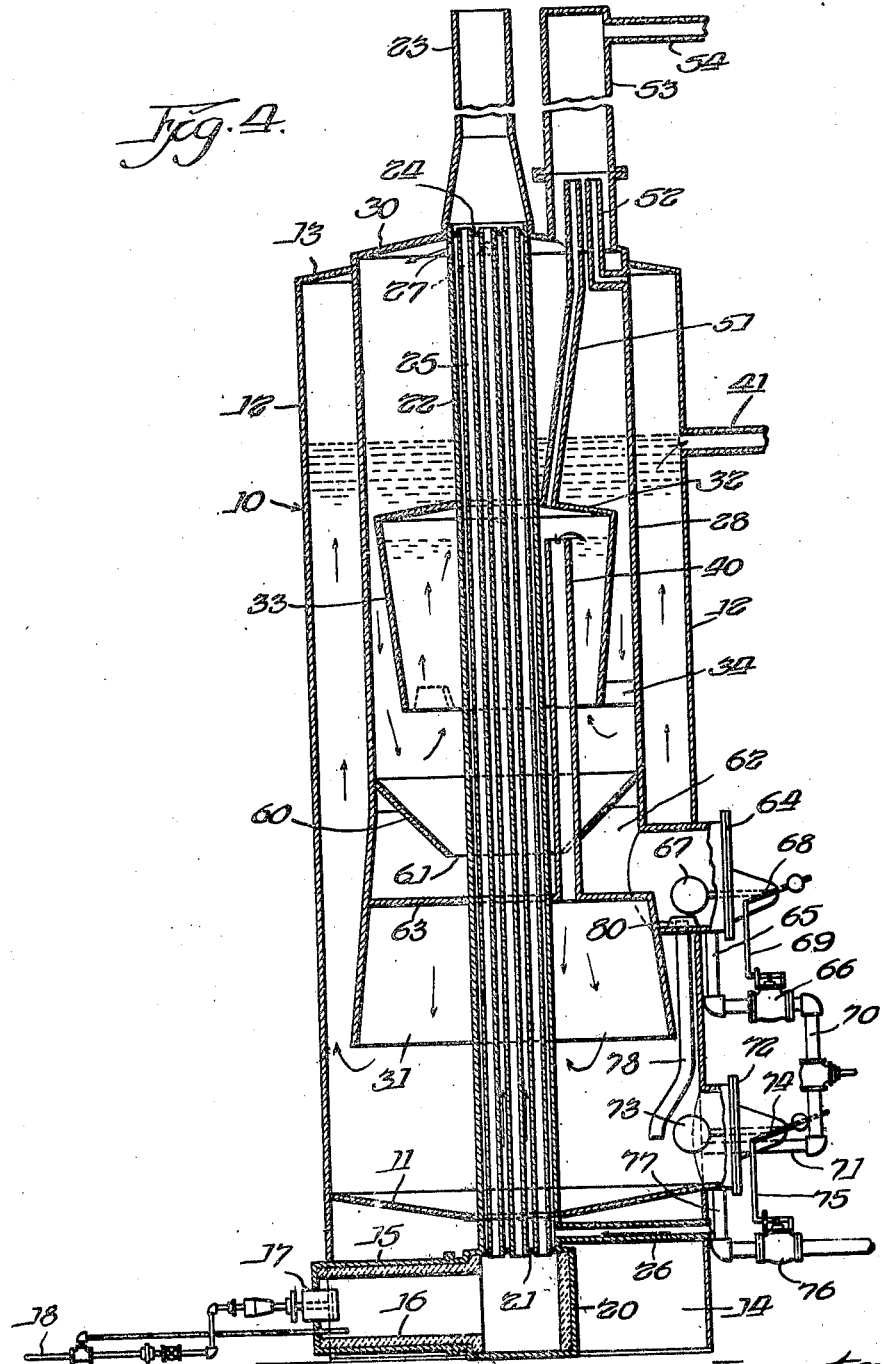

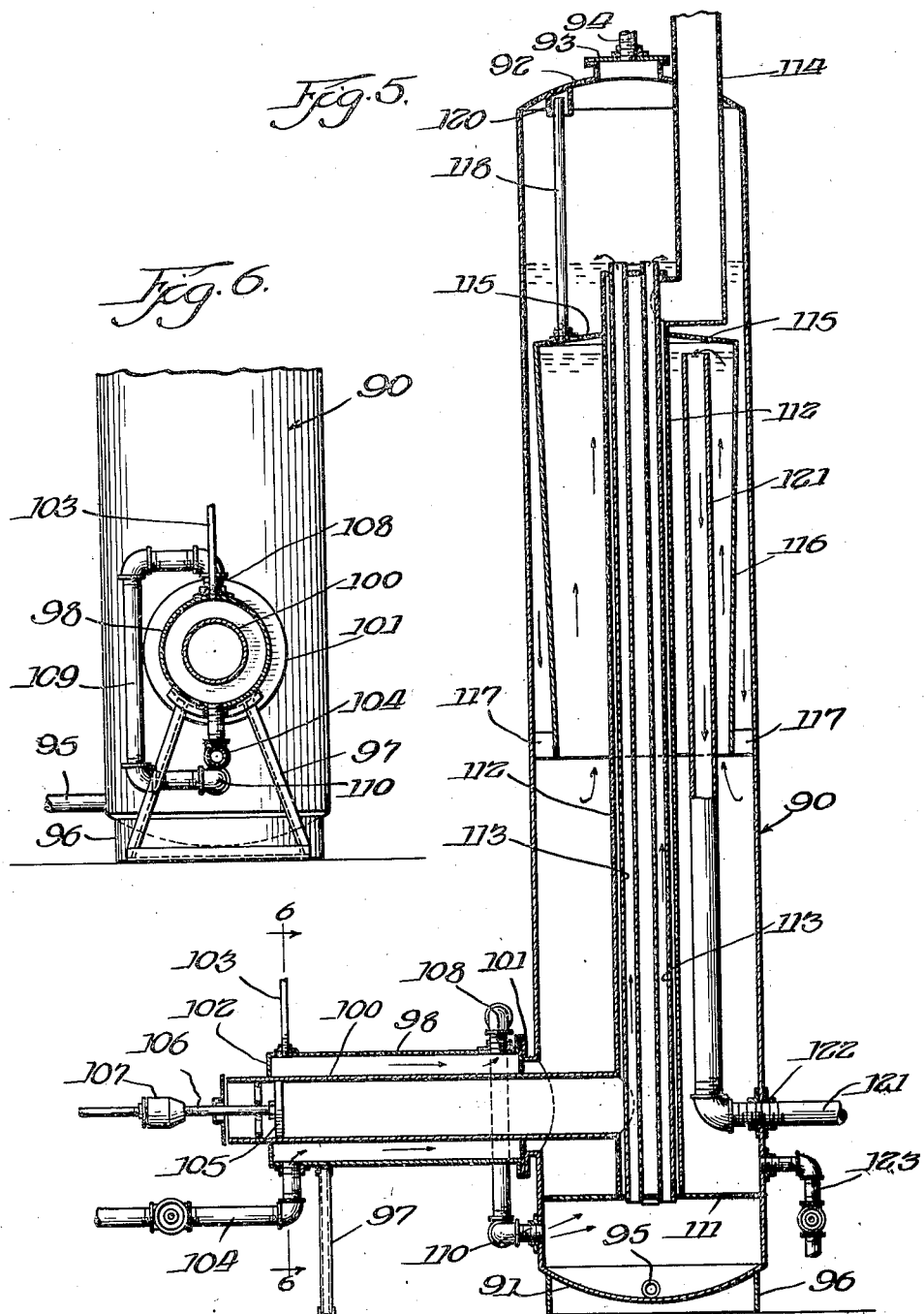

2,326,384

UNITED STATES PATENT OFFICE 2,326,384

DEMULSIFYING AND SETTLING TANK

Walter M. Mount, Tulsa, Okla.

Application October 14, 1941, Serial No. 414,961

9 Claims. (Cl. 210—52.5)

The invention relates to an apparatus for demulsifying and settling liquids, and has more particular reference to improved apparatus such as shown in my Patent No. 2,156,123 granted April 25, 1939, for removing excess free water and sediment from crude oil and similar liquids, and which will also demulsify the oil by breaking down the water-oil emulsions. This application is a continuation-in-part of my application Serial No. 227,385, filed August 29, 1938.

Before crude oil, that is, oil as it is taken from the wells, can be delivered to pipe lines for transportation to distant parts, it is necessary to clarify the oil so that its content of water, emulsion and sediment does not exceed approximately one-half of one per cent. This requires intensive clarification and demulsification of the crude oil. For breaking down the emulsions, it is necessary to heat the oil, which has generally been done in a tank at some distance from the well. The water-oil emulsions may be considered a mixture of liquids of different specific gravities. The application of heat facilitates the separation of one liquid from the other, since a liquid of less specific gravity will expand at a greater rate than a liquid of greater specific gravity. As regards water-oil emulsions, the oil is of less specific gravity than the water, and upon the application of heat the oil rises and the water, together with the solids and other sediment, settles to the bottom.

The most serious objection to apparatus heretofore used for demulsifying and settling crude oil has been the inefficient use made of the heat added to the oil, and its uneven distribution throughout the mass being treated. The present apparatus is highly efficient in this respect since all operations, namely, the heating, demulsifying of the oil, and its clarification, are performed within one tank.

The present apparatus essentially consists of a closed tank having an inlet for the oil at the bottom and an outlet at the top. The inlet discharges the crude oil into a vertical heating chamber, through which the oil flows in an upward direction to be discharged at the top into a clarifying chamber having surrounding relation with said heating chamber. In this clarifying chamber, the heated oil flows downwardly until it reaches an upflow zone forming part of the clarifying chamber, whereupon the oil flows upwardly to be eventually discharged in a downward direction therefrom. During travel through the clarifying chamber, the maximum clarification and demulsification of the oil is effected. However, additional treatment is often required and for this purpose, as illustrated in Figures 1 to 4 hereof or in said Patent 2,156,123, said chamber opens into the tank and the oil discharged therefrom flows upwardly, and during this flow further demulsification and settling may occur.

The central location of the heating unit is advantageous for uniformly distributing the heat throughout the oil in the tank. A feature of the present invention resides in a single clarifying chamber which has surrounding relation and is concentric with the heating chamber. The heat given off at various heights of the heating unit may be considered as decreasing upwardly, whereas the amount of heat given off by the oil flowing down in the clarifying chamber decreases downwardly. As a result, the oil undergoing treatment is maintained at a fairly even temperature which greatly aids in breaking down the water-oil emulsions, and the heat imparted to the oil initially is used in the most efficient manner.

An object of the present invention is to provide a demulsifying and settling tank having a centrally disposed heating unit and a single clarifying chamber concentrically arranged with respect to said heating chamber so that the liquid which flows in said clarifying chamber is in surrounding relation with and absorbs heat from the heating unit.

Another object of the invention is to provide a device such as described including a heating chamber and a clarifying chamber, wherein the oil or other liquid being treated will have a decreasing velocity from the inlet to the outlet. In the present apparatus, the velocity of flow is a maximum through the heating unit. A reduction in the velocity takes place in the clarifying chamber since the effective cross-sectional area of this chamber is greater than that of the heating unit. The oil from the clarifying chamber may flow upwardly in the tank, and here again the effective cross-sectional area is greater than that of the clarifying chamber.

A further object of the invention resides in the provision of equipment in the clarifying chamber which will operate on the counter-flow principle to produce clarification of the liquid. This equipment promotes an upward flow of the liquid within the clarifying chamber, and which takes place at a gradually decreasing velocity, whereby the heavy liquids, sediment and foreign matter will have a tendency to flow downwardly or counter thereto towards the discharge outlet.

A further object of the invention resides in the provision of means whereby excess pressures in any part of the apparatus are effectively controlled and which prevents untreated oil from reaching the outlet of the tank.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1 is a vertical cross-sectional view showing the improved demulsifying and settling tank of the invention;

Figure 2 is a transverse sectional view taken substantially on line 2—2 of Figure 1, and showing the concentric relation of the heating chamber, clarifying chamber and tank;

Figure 3 is a transverse sectional view taken substantially on line 3—3 of Figure 1;

Figure 4 is a vertical cross sectional view showing a modified form of demulsifying and settling tank coming within the invention; and Figures 5 and 6 are vertical sectional views showing another embodiment of the invention that has been simplified to include only the heating chamber and clarifying chamber.

In the embodiment of the invention disclosed in Figures 1, 2 and 3, numeral 10 indicates the cylindrical tank or container within which the several units, namely, the heating unit and the clarifying unit, are located. The tank 10 has a sloping base 11, side walls 12 and top 13. The side walls 12 depend below the base 11, forming a lower compartment 14 within which is located the combustion chamber designated by numeral 15 and which is suitably lined with refractory material 16. The burner 17, positioned in the front end of said chamber, provides the main heating unit for heating the oil to be treated, as will be presently described. The burner is supplied with fuel by the pipe 18.

The inwardly directed end of the combustion chamber has communication with the firebox 20, also suitably lined with refractory material 16. The top 21 of the firebox forms the base of the heating unit, comprising the cylinder 22 extending vertically of the tank and extending beyond the tank, which extension forms the chimney 23 for taking off the products of combustion. The numeral 24 indicates the top plate of the heating unit. Extending vertically within the heating unit and for the entire length thereof are a plurality of fire tubes 25. Said tubes extend through and project a short distance below the plate 21, and also extend through and project a short distance above the top plate 24. The products of combustion and the burning gases from the combustion chamber and firebox and which are at a high temperature, enter the fire tubes 25 and travel the length of the same, to be eventually discharged from said tubes into the chimney 23. The lower portion of the fire tubes is maintained at a high temperature by the burning gases flowing therethrough, and the liquid which enters the heating chamber at the inlet 26 therefore has surrounding relation with the fire tubes and is soon heated to a relatively high temperature as the structure described is very efficient in heat transfer. The height of the heating unit is another factor insuring heating of the oil or other liquid to be treated, to the highest temperature possible for the amount of heat produced by the burner 17.

The cylindrical wall 22 of the heating unit is provided with a plurality of outlets 27 at the upper end thereof. The heated oil or other liquid from the said heating unit 22 is delivered by the outlets to a clarifying chamber formed by the cylindrical walls 28, closed at the top by a member 30.

In this improved form of demulsifying and settling tank, a single clarifying chamber is used and which is disposed in surrounding relation with the heating unit, it being observed that the cylindrical wall 28 is concentric with the wall 22 of the heating unit. The clarifying chamber or member has an open flaring bottom 31, and the liquid which flows downwardly through the clarifying member is discharged thereby into the base of the tank 10. Within the cylindrical wall 28 is positioned a tray 32 which has a gradual slope toward the periphery thereof and which is provided with a depending flange 33. The clarifying member is suitably held in position within the tank since the top 13 of the tank has connection to the cylindrical wall 28 and also by reason of the connection between the top 30 of the clarifying member to the wall 22 of the heating chamber. The tray 32 likewise connects with the wall 22 of the heating unit, and the depending flange 33 is properly positioned by members 34 connecting the lower portion of the flange with the inside wall of the clarifying member.

Below the peripheral flange 33, the clarifying unit is provided with a partition 35 of inverted cone shape. Said partition forms a base or a sludge basin for the clarifying chamber and is provided with one or more sludge-draw-off pipes 36 depending from the horizontal pipes 37 which connect with the bottom of the sludge basin and extend outwardly through the wall of the tank. Each of the pipes 37 is normally closed at its outer end by the plug 38, which, however, is removable so as to allow the operator to insert a rod for the purpose of removing any deposit which may build up in the base of the sludge basin.

The sludge basin is also provided with standpipes 40 extending vertically upward from said base and terminating a short distance below the tray 32. One or more stand-pipes may be provided, equally spaced around the circumference of the heating chamber and relatively close to the wall 22 thereof. These pipes form a clear liquid outlet for the clarifying zone formed by tray 32 and the peripheral depending flange 33 thereof. The liquid is first caused to flow downwardly in the clarifying chamber 28 to below the peripheral flange 33. From here the liquid will continue its flow in an upward direction to the clear liquid outlets 40. These outlets discharge the liquid into the flaring open end 31 of the clarifying member. As shown in the drawings, the said clarifying member at its open end communicates with the interior of the tank, and accordingly the liquid therefrom is discharged into the tank.

Referring again to the peripheral flange 33, it will be observed that said flange converges inwardly toward its base to form a peripheral discharge passage with the cylindrical wall of the clarifying unit, and which is of gradually increasing cross-sectional area downwardly. On the other hand, the zone formed by the tray and the depending flange increases in cross-sectional area in a direction upwardly. As a result of this design, the velocity of flow of the liquids and solids tends to decrease both in the discharge passageway as well as in the clarifying zone. The result obtained is a higher clarifying capacity for a given volume tank.

Since the object is to gradually decrease the velocity of flow from the discharge passage to the clear liquid outlet, it is obvious that a peripheral discharge passage is provided instead of a central discharge passage. The increase in cross-sectional area of the discharge passage in a downward direction, in addition to the decrease in the velocity of the liquid flowing through said passage, effectively eliminates the settling or collection of the solids on the depending flange. Therefore, the passage is at all times open and the flow of liquid is gradually decreasing, and which continues as the liquid flows upwardly within the clarifying zone formed by said tray and depending flange. As a result of this slow movement of the liquid, the heavy particles are precipitated, and even the finer particles are filtered from the liquid so that only the clarified liquid reaches the outlet formed by the stand-pipes 40.

The action of the clarifying tray in clarifying the liquid as above described, is also highly efficient for breaking down emulsions such as the water-oil emulsions in the crude oil. As described, this breaking down of the emulsions requires the application of heat to the liquid since heat facilitates separation of one liquid from the other. The oil is of less specific gravity than water, and therefore the oil will rise and flow into the clarifying zone. During this movement of the oil, intensive demulsification thereof takes place since the tendency of the water is to settle. The settling out of the water is further aided by the fine particles in suspension in the liquid at the entrance of the clarifying zone. There is a tendency for these fine particles to form in layers, segregated according to size and density, and these layers form an excellent filter for the rising dispersion medium. The settling of the water, solids and other sludge is towards the sludge basin 35, and the same is removed by one or more sludge draw-offs 36.

A material reduction in flow of the clear liquid downwardly from the end of the stand-pipes 40 is obtained due to the fact that the quantity of liquid has been reduced by the removal of the water, sludge or other foreign particles therefrom. This flow of the clear liquid further is gradually reduced as a result of the flaring open end of the clarifying unit. From the clarifying unit, the clear liquid is discharged into the tank, the effective cross-sectional area of which is greater than the effective cross-sectional area of the said clarifying unit. This is in accordance with the invention, which contemplates a reduction in velocity of flow from the heating unit to the clear liquid outlet 41 located in the upper portion of the tank. The flow of the liquid within the tank 10 therefore is in an upward direction, and this direction of flow, as previously described with respect to the clarifying zone, promotes settling of the water and sediment to the bottom of the tank.

The water and sludge draw-off 42 is located in the bottom portion of the tank 10, the same being provided with a valve indicated by numeral 43, having regulating means 44. Above the draw-off 42 the tank is provided with a flanged connection 45, within which is located a ball-float 46. Said float is secured to shaft 47 journalled by the connection 45, and one end of which extends through the packing gland 48. The outwardly extending end of the shaft 47 is connected by the rod 50 with the regulating means 44 of the valve 43.

During operation of the demulsifying tank, the water level will be maintained substantially constant by the float 46 since movement of the float upwardly, which takes place when the water level rises, will actuate valve 43 to open the draw-off, thereby lowering the water level within the tank. The travel of the clear liquid, such as oil discharged from the stand-pipes 40, will take place through water, and likewise the flow upwardly between the tank walls and the flaring bottom 31 of the clarifying chamber will take place through the body of water maintained within the bottom portion of the tank. The liquids, however, will be at a relatively high temperature, and this flow, together with the high temperature, promotes the breaking down of any water and oil emulsions in the crude oil.

In order to equalize the pressure within the tank, clarifying chamber and within the clarifying zone, the invention provides gas relief vents in the form of upwardly directed pipes 51 and 52. Pipe 51 extends upwardly from the tray 32 and serves to relieve excessive gas pressures which build up under the tray. In the event some liquid may be located in advance of the gas, the said liquid will be discharged from the top of pipe 51 and will be returned to the clarifying chamber. Pipe 52 serves to vent the top portion of the tank, and here again the open end of the vent will discharge into the clarifying chamber. As a result of this structure, any liquid which may be inadvertently carried by the excessive gas pressure will be returned to the clarifying chamber for further clarification and demulsification. The connection 53 encloses the upper end of pipes 51 and 52, and is provided with the gas outlet 54 by which the gas is withdrawn from the apparatus.

The central location of the heating unit within the tank 10 is advantageous for distributing the heat throughout the mass of oil in the tank. The liquid discharged from openings 27 is at a relatively high temperature, and as this high temperature liquid flows downwardly, heat is given off thereby to the oil in the upper portion of the tank. However, heat is given off to the liquid as it flows downwardly in the clarifying chamber, since the chamber is concentric with and in surrounding relation with the heating unit.

The present apparatus has been designed to maintain a comparatively even temperature throughout the mass of liquid in the tank. This is largely responsible for the high efficiency of the apparatus in breaking down the emulsions and settling the foreign particles from the liquid. All operations, that is, the heating, clarifying and demulsifying of the liquid, are performed within one container, and accordingly less heat is required to secure the desired results than has heretofore been possible. The invention contemplates using the gas produced as a result of the heating of the oil for operating the burner 18, and since comparatively very little fuel is required to operate the present apparatus because of its high efficiency, it is believed that the gas withdrawn from the gas outlet 54 will be sufficient for operating the said burner.

The modified form of tank shown in Figure 4 may be operated at a high water level or at a low water level, depending on the behavior of the crude oil or other liquid passing through the tank. In the structure of Figure 1 the float 46 controls the water level and which may be described as a relatively high level, requiring the clarified liquid discharged from the standpipes 40 to pass downwardly through a body of salt water, in the case of crude oil demulsification, and then upwardly also through a body of salt water surrounding the open flaring bottom of the clarifying chamber. Certain types of crude oil are benefited by this travel through the high temperature salt water in that any emulsions are caused to settle out. However, other types of crude oil react adversely and tend to combine with the salt water during travel therethrough, thus increasing their content of water-oil emulsions. For such oils the modified device of Figure 4 has been primarily designed since in this embodiment of the invention the tank can be operated at a low water level.

The changes reside in providing the interior of the clarifying chamber with a member 60 forming a sludge basin with respect to the tray 32 and depending flange 33 and which sludge basin is substantially open at its lower end since member 60 is spaced from the heating chamber 22. Through this annular opening, indicated by numeral 61, the salt water, sludge and other liquids settling out in the clarifying zone will be discharged into a chamber 62 formed by the member 60 and a partition 63. The salt water, sludge and other liquids entering said chamber can escape therefrom only by passing through an outlet provided by the flanged connection 64. Pipe 65 forms said outlet and is provided with the float controlled valve 66. The float 67 is located within chamber 62 or more properly within the flanged connection 64 leading from said chamber and is journalled by shaft 68 extending out from one side of said connection. The linkage 69 operatively connects said shaft and thus the float with the valve 66 so that the water and sludge in the chamber 62 is maintained at a fairly uniform level. From valve 66 pipes 70 and 71 conduct the liquid and discharge the same into the tank at its bottom relatively close to the base 11.

Said tank is provided with a second flanged connection 72 which is on approximately the same level with the pipe 71 and this second connection also provides a ball float 73 journalled by shaft 74, to which is operatively secured the linkage 75. Said linkage actuates the valve 76 located in the outlet pipe 77 for the tank. The valve 76 is therefore also float controlled and the water and sludge from the tank is drawn off at a rate to maintain a low water level within said tank.

Before describing the operation of the above structure it must be mentioned that the chamber 62 has an outlet in the form of pipe 78 which leads directly from said chamber into the lower end of tank 10, terminating relatively close to the bottom 11. This outlet from chamber 62 therefore by-passes the float controlled valve 66. However, when the tank is being operated on the low water level the outlet 78 is closed by the cap 80. It will therefore be seen that any solid, water, sludge and other liquid settling out of the oil and which is caught by the sludge basin will be immediately discharged through the annular opening 61 into chamber 62. This chamber is closed off from the oil and with outlet 78 closed by plug 80 the liquid must drain through the float controlled valve 66, whereupon the same will be deposited in the lower end of the tank 11. Here the liquid level is maintained at a relatively uniform height by the float 73 and which height is approximately that of said float when horizontal, as shown in Figure 4. With this low water level the oil from the standpipes 40 will be discharged into the lower flaring end 31 of the clarifying chamber. As the water level is considerably below the said chamber this clarified oil will not come in contact with the salt water but will flow around the bottom end of said chamber and upwardly through the tank without again contacting or coming into association with any salt water.

When it is desired to operate the tank on a high water level the plug 80 is removed from outlet 78 and thus the liquid from chamber 62 will by-pass valve 66 and will be discharged directly to the bottom of the tank. The upper ball float 67 is then operatively connected in a manner as suggested in Figure 1 with the float controlled valve 76. The water will build up within the tank and will eventually reach a level within the tank equal to that of the ball float 67. It will be clearly understood, of course, that the water level in the tank will equalize with that within chamber 62 since the parts are connected through pipe 78. When the apparatus is operated in this manner a high water level exists and the clarified oil discharging from standpipes 40 will pass downwardly through this water and also upwardly through the same before it reaches the oil in the upper part of the tank and which is eventually drawn off through outlet 41.

In the embodiment of the invention shown in Figures 5 and 6 the structure has been simplified by the elimination of the outer enclosing tank. Therefore, in this modification the exterior tank or cylindrical member forms the clarifying chamber and the same is provided with a vertically extending heating chamber. Said member includes cylindrical walls 90 having a domed bottom 91 and a domed top 92, the latter having a removable cover 93 for closing the opening in said domed top and which provides a vent pipe 94 for gases to prevent their accumulation within the member. A drain 95 is located adjacent the domed bottom 91. The cylindrical member is suitably supported by structure 96 and the channel legs 97 also support on the same foundation the cylindrical jacket 98 surrounding the fire tube 100. The exterior jacket forms with said fire tube an annular space for initially heating the crude oil or other liquid in advance of delivering the same to the heating chamber.

The jacket 98 is secured to the cylindrical member at the base thereof by means of flanges 101 and which seal said end of the jacket with respect to the fire tube. The outer end of the jacket is also closed by wall 102 and the interior space thus formed is provided with a vent 103 and with an inlet 104 for the crude oil. The axially extending fire tube 100 is provided with a burner 105 connecting with the inlet pipe 106 for the gas, having an air adjustment at 107. The burner provides the main heating unit for heating the liquid to be treated, the liquid entering the jacket by inlet 104 and after flowing the length of the same the liquid which has now been initially heated, will leave the annular space by the outlet 108. Said outlet, as best shown in Figure 6, connects with pipe 109 which at 110 enters the cylindrical member at the lower end thereof. This lower end of the member forms an inlet chamber for the heated liquid, the chamber being separated from the clarifying chamber by means of the auxiliary bottom 111. The heating chamber 112, which extends vertically within the cylindrical member, connects with the auxiliary bottom 111 to close off this end of the chamber and the same also connects with the fire tube 100. The pipes 113 for the liquid extend within the heating chamber and project from the respective ends of the same. At the base the pipes extend through the auxiliary bottom 111 and therefore into the chamber for the liquid located below this auxiliary bottom wall. By projecting above the upper end of the heating chamber the pipes extend into and communicate with the clarifying chamber formed by the cylindrical member 90. The gases and products of combustion are conducted from the heating chamber by the flue 114 which extends through the domed top 92 of the member.

This form of the apparatus is similar to that shown in Figures 1 and 4 in the provision of clarifying means in surrounding relation with the heating unit. Said clarifying means includes the tray 115 which encircles the heating chamber 112 and has a gradual slope toward the periphery thereof. At said periphery the tray is provided with a depending flange 116 which is directed inwardly to a slight extent in a downward direction so as to form with the walls of the cylindrical member a peripheral passage of gradually increasing cross sectional area in a direction downwardly. The depending flange is concentric with the heating chamber and is suitably supported from the cylindrical member by the supports 117. The vent pipe 118 connects with the tray 115 and extends upwardly within the clarifying chamber to communicate with the inverted cup 120 which forms an oil trap. The vent pipe functions to vent the gases from under the tray by conducting them to the upper part of the clarifying chamber and therefore the pressure within the clarifying zone formed by said tray and depending flange is equalized with that in the clarifying chamber. One or more outlet pipes 121 are located between the depending flange and the heating chamber. The entrance to said pipes formed by the open end thereof is positioned directly below the tray 115 and said pipes extend to the bottom portion of the cylindrical member, at which point they pass out through the wall thereof. The outlet pipe in passing through the wall of the member is effectively sealed by the parts 122.

In the operation of the form of the invention shown in Figures 5 and 6 the crude oil or other liquid to be treated upon entering the space provided by jacket 98 is initially heated as the same is caused to flow around the fire tube 100. The heated liquid is then admitted to the base of the cylindrical member at 110 and from this bottom chamber the liquid flows upwardly through the tubes 113 to be discharged into the clarifying chamber at a point above the tray 115. Considerable heat is imparted to the liquid during its up-flow within the heating chamber and the liquid is additionally maintained in heated condition during downflow within the clarifying chamber. In its flow through the clarifying chamber the liquid will initially flow through the peripheral passage, and since the same is in a downward direction the heavy particles, foreign matter and sludge in the liquid are caused to settle out by gravity and deposited on the bottom 111 in the same manner as the sludge basin collects the foreign matter and sludge in Figures 1 and 4. The clarifying means including tray 115 and flange 116 form a clarifying zone in surrounding relation with the heating chamber through which the liquid is required to flow in an upward direction. During this upward flow demulsification of the liquid is completed in a manner similar to that heretofore described with respect to Figures 1 and 4 and the water and other foreign matter caused to settle out is deposited by gravity in the base of the tank formed by the auxiliary bottom 111. The tank is drained periodically by the sludge draw-off 123. The clear liquid which rises to the top of the clarifying zone overflows into the outlet pipe 121 and the clear liquid is drawn off from said clarifying chamber by means of said outlet pipe.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In apparatus for demulsifying and settling liquids, a cylindrical member, a top and bottom for said member forming therewith a clarifying chamber, said member having an outlet for withdrawing foreign matter and sludge from said chamber, a heating chamber extending through the said bottom and axially within the clarifying chamber, a raw liquid inlet connecting with the heating chamber at the base thereof and an outlet in its upper end for discharging heated liquid into the upper part of the clarifying chamber, a tray within the clarifying chamber and encircling the heating chamber below the outlet, a peripheral flange depending from said tray and terminating above said bottom, said depending flange having spaced relation with the cylindrical member thus providing an annular passage through which the liquid flows in a downward direction, said tray and flange forming an inner clarifying zone in surrounding relation with the heating chamber and within which zone the liquid flows upwardly, and an outlet for clear liquid in the clarifying zone directly below the tray.

2. In apparatus for demulsifying and settling liquids, a cylindrical member, a top and bottom for said member forming therewith a clarifying chamber, said member having an outlet for withdrawing foreign matter and sludge from said chamber, a heating chamber extending through the said bottom and axially within the clarifying chamber, a raw liquid inlet connecting with the heating chamber at the base thereof and an outlet in its upper end for discharging heated liquid into the upper part of the clarifying chamber, a tray within the clarifying chamber and encircling the heating chamber below the outlet, a peripheral flange depending from said tray and terminating above said bottom, said depending flange having spaced relation with the cylindrical member thus providing an annular passage through which the liquid flows in a downward direction, said tray and flange forming an inner clarifying zone in surrounding relation with the heating chamber and within which zone the liquid flows upwardly, an outlet for clear liquid in the clarifying zone directly below the tray, and means for venting the gases from within the clarifying zone to the upper end of the cylindrical member.

3. In a demulsifying and settling tank, a heating chamber extending vertically within the tank and having an inlet for raw liquid at the base of the chamber, a clarifying member within the tank disposed in concentric relation with the heating chamber, said member having a substantially closed top and an open bottom to form a clarifying chamber, the heating chamber having an outlet in its upper end for discharging heated liquid into the upper part of said clarifying chamber, whereby the liquid flows upwardly in the heating chamber and downwardly in the clarifying chamber to be discharged into the tank from the open bottom of the clarifying member, means within the clarifying chamber in encircling relation with the heating chamber for separating sludge and other foreign matter from the liquid by reversing the direction of flow to establish an intermediate zone of upward flow, an outlet for clear liquid in the upper portion of the tank, and a sludge outlet in the base of the tank.

4. In a demulsifying and settling tank, a heating chamber extending vertically within the tank and having an inlet for raw liquid at the base of the chamber, a clarifying chamber within the tank disposed in concentric relation with the heating chamber and having a closed top and an open bottom, the heating chamber having an outlet in its upper end for discharging heated liquid into the upper part of the clarifying chamber, clarifying means in the clarifying chamber including a tray encircling the heating chamber below the outlet, a peripheral flange depending from said tray, the depending flange forming an annular passage with the wall of the clarifying chamber through which the liquid flows in a downward direction, said tray and flange forming an inner clarifying zone having surrounding relation with the heating chamber and within which the liquid flows upwardly, a partition in the clarifying chamber providing a sludge basin in spaced relation below the clarifying zone, an outlet for the clear liquid in the clarifying zone extending through the partition and discharging within the open bottom end of the clarifying chamber, a draw-off for the clear liquid in the upper portion of the tank, and a sludge outlet in the base of the tank.

5. In a demulsifying and settling tank, a heating chamber extending vertically within the tank and having an inlet for law liquid at the base of the chamber, a clarifying chamber within the tank disposed in concentric relation with the heating chamber and having a closed top and an open bottom, the heating chamber having an outlet in its upper end for discharging heated liquid into the upper part of the clarifying chamber, clarifying means in the clarifying chamber including a tray encircling the heating chamber below the outlet, a peripheral depending flange provided by said tray, the depending flange forming an annular passage with the wall of the clarifying chamber through which the liquid flows in a downward direction, said tray and flange forming a clarifying zone with the heating chamber within which the liquid flows upwardly, a partition in the clarifying chamber providing a sludge basin in spaced relation below the clarifying zone, an outlet for the clear liquid in the clarifying zone extending through the partition and discharging within the open bottom end of the clarifying chamber, a draw-off for the clear liquid in the upper portion of the tank, and means for venting the gases from under the tray to equalize the pressure within the clarifying zone and within the clarifying chamber with the pressure in the upper portion of the tank.

6. In apparatus for demulsifying and settling liquids, a cylindrical tank having an outlet for clarified liquid and an outlet for sludge, a clarifying chamber in the tank having an inlet for raw liquid at its upper end, said clarifying chamber having an open bottom whereby liquid flows through the same in a downward direction and is discharged into the tank, a tray having a peripheral depending flange located within said chamber and forming means for clarifying the liquid by separating foreign liquids, sludge and other particles therefrom, a sludge basin provided below said clarifying means, means forming a compartment below the sludge basin and within said clarifying chamber for receiving the separated liquids, sludge and other particles from the sludge basin, a drain for said compartment discharging into the bottom portion of the tank, and outlets passing through said compartment for discharging the clear liquid from the clarifying means into the open end of said chamber.

7. In apparatus for demulsifying and settling liquids, a cylindrical tank, a clarifying chamber in the tank having an inlet for raw liquid at its upper end, said clarifying chamber having an open bottom whereby liquid flows through the same in a downward direction and is discharged into the tank, a tray having a peripheral depending flange located within said chamber and forming a clarifying zone for the liquid for separating foreign liquids, sludge and other particles therefrom, a sludge basin provided below said clarifying zone, means forming a compartment below the sludge basin and within said clarifying chamber for receiving the separated liquids, sludge and other particles from the sludge basin, a drain for said compartment discharging into the lower end of the tank, float controlled means for said drain, outlets passing through the sludge basin and said compartment for withdrawing the clear liquid from the clarifying zone and discharging the same into the open bottom end of said chamber, a clear liquid outlet in the upper portion of the tank, and an outlet in the base of the tank for the separated liquids, sludge or other particles.

8. In apparatus for demulsifying and settling liquids, a cylindrical tank having an outlet for clarified liquid, an inlet chamber for the liquid disposed vertically of the tank and through which the liquid flows in an upward direction, a clarifying chamber in the tank in concentric relation with said inlet chamber and having a fluid inlet connection therewith at its upper end, said clarifying chamber having an open bottom whereby the liquid flows through the same in a downward direction and is discharged into the tank, means in the clarifying chamber in surrounding relation with the inlet chamber for separating foreign liquid, sludge and other particles from the liquid flowing therethrough, a sludge basin provided by said clarifying chamber below said means for collecting the separated liquids, sludge and other particles, a partition in the clarifying chamber forming a compartment below the sludge basin and in surrounding relation with the inlet chamber for receiving the liquids and sludge from the sludge basin, a drain for said compartment having connection with said tank at the lower end thereof whereby said separated liquids and sludge are discharged into the lower portion of said tank, a drain for said tank, and means for conducting the clear liquid from said clarifying means and for discharging the same into the tank.

9. A demulsifying and settling tank for liquids including a vertically extending inlet cylinder within the tank having an inlet for raw liquid at its lower end, a second cylinder within the tank concentrically arranged with respect to the inlet cylinder and having a fluid inlet connection with the inlet cylinder at its upper end, said second mentioned cylinder at its lower end opening into the tank whereby the liquid flows upwardly in the inlet cylinder and downwardly in the second mentioned cylinder to be discharged into the tank, means for clarifying the liquid within the second mentioned cylinder having surrounding relation with the inlet cylinder, said means reversing the direction of flow to decrease the rate of flow of the liquid through said means, whereby foreign liquids, solids and other matter are caused to separate out by gravity, an outlet in the base of the tank for said foreign liquids, solids and other matter, and an outlet in the upper portion of the tank for the clarified liquid.

WALTER M. MOUNT.